United States Patent [19]

Aoyama

[11] Patent Number: 5,353,126

[45] Date of Patent: Oct. 4, 1994

[54] IMAGE PROCESSOR HAVING AN EDIT LIMITING FUNCTION

[75] Inventor: Teruyuki Aoyama, Kanagawa, Japan

[73] Assignee: Fuji Xerox Co., Ltd., Tokyo, Japan

[21] Appl. No.: 858,619

[22] Filed: Mar. 27, 1992

[30] Foreign Application Priority Data

Mar. 28, 1991 [JP] Japan .................................. 3-064439

[51] Int. Cl.$^5$ .......................................... H04N 1/387
[52] U.S. Cl. .................................. 358/452; 358/537; 358/531
[58] Field of Search ................. 358/452, 80, 453, 441, 358/437, 450

[56] References Cited

U.S. PATENT DOCUMENTS

| | | | |
|---|---|---|---|
| 4,802,229 | 1/1989 | Yamada | 358/441 |
| 5,075,787 | 12/1991 | Shaughnessy | 358/452 |
| 5,079,624 | 1/1992 | Sasuga et al. | 358/80 |
| 5,113,251 | 5/1992 | Ichiyanagi et al. | 358/453 |

*Primary Examiner*—Edward L. Coles, Sr.
*Assistant Examiner*—Madeleine Nguyen
*Attorney, Agent, or Firm*—Finnegan, Henderson, Farabow, Garrett & Dunner

[57] ABSTRACT

An image processor having edit functions and subjecting image data obtained by reading a document to an edit process and outputting the edited image data. The image processor includes an input section for inputting an edit instruction, a judgment section having inappropriate edit instruction judgment data, for judging whether or not the inputted edit instruction is inappropriate, and an alarm section for outputting alarm data based on the judgment of whether or not the inputted edit instruction is inappropriate.

9 Claims, 6 Drawing Sheets

| EDIT FUNCTION | INAPPROPRIATE DATA | CONDITION | ALARM DATA |
|---|---|---|---|
| PAINT | SAME COLOR | ONCE | 001 |
| | COMPLEMENTARY COLOR | LAST | 002 |
| COLOR CONVERSION | SAME COLOR BEFORE CONVERSION | | 003 |
| | COMPLEMENTARY COLOR BEFORE CONVERSION ⋮ | | NONE |

PAINT

| SPECIFIED COLOR | COUNTER VALUE |
|---|---|
| | |

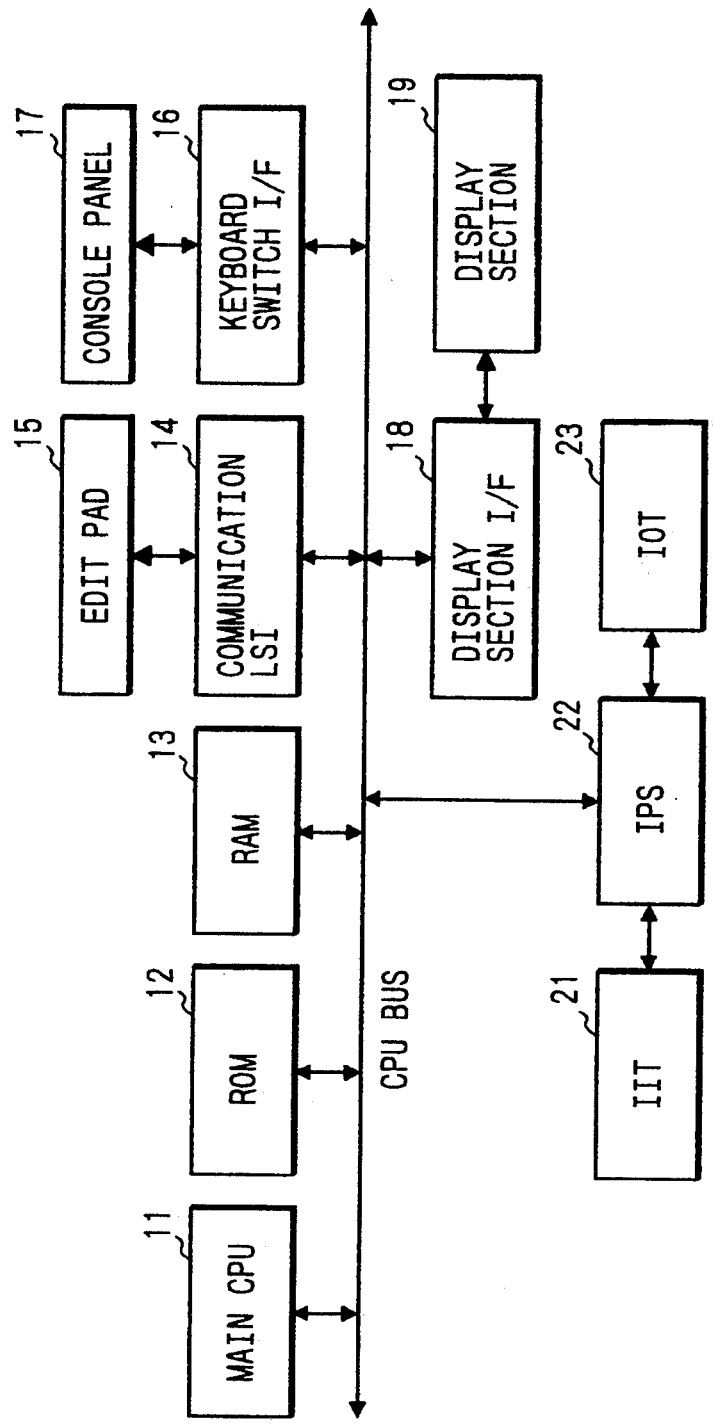

IMAGE PROCESSOR HAVING AN EDIT LIMITING FUNCTION

BACKGROUND OF THE INVENTION

1. Field of the Invention

The invention relates to am image processor capable of limiting edit functions such as painting and color-converting with respect to a document.

2. Description of Related Art

A digital copy machine includes an image input terminal (IIT) for reading a document to obtain image data, an image processing system (IPS) for processing the image data, and an image output terminal (IOT) for outputting copies while driving, e.g., a laser printer, in accordance with the image data. The image input terminal, among these components, extracts image data from the document as an analog electric signal corresponding to a reflectance of light using a CCD (charge-coupled device) sensor and converts this electric signal to multi-tone digital image data. The image processing system for processing such multi-tone digital image data subjects these data to various edit operations including correction and conversion as appropriate and stores the processed data if necessary. The image output terminal outputs a dotted image by turning a laser, in the laser printer, on and off in accordance with the image data processed by the image processing system.

The thus constructed digital copy machine can subject documents to various edit processing including painting, color conversion, trimming, shifting, synthesis, reduction, and enlargement freely, to produce copies edited in diversified ways with a capability of reproducing multi-tone image data with a high resolution. Further, the image input terminal reads a document in the form of signals obtained by color-separating the document into the three primary colors, R (red), G (green), and B (blue), while the image output terminal prepares dotted toner images, each corresponding to Y (yellow), M (magenta), C (cyan), or K (black), from the above signals and outputs these toner images superimposed one upon the other to produce a color image.

However, even if the digital copy machine can edit documents freely and produce copies, in the case where all edit instructions are accepted without any restriction, inappropriate edit instructions can be followed undesirably.

For example, the paint function, which is one of the edit functions featured in the color digital copy machine, will be described. The number of optional colors is limited by the hardware, but as long as the color is one of the optional colors, a user has the freedom of selecting it. Thus, even if the specified colors form a color distribution that is loud, gloomy, out of harmony, inconsistent, or generally unfitted, the user gets no idea of how it appears until he the hard copy. As a result, he may have to change the color specification, leading to production of many copies, not only wasting resources such as copy paper, toner, electric power, and time, but also preventing the desired copy from being obtained quickly. This is often experienced by users who do not have expertise in color coordination and users who are less skillful in using.

SUMMARY OF THE INVENTION

The invention has been made in view of the above circumstances. Accordingly, an object of the invention is to warn an operator that an inappropriate content is instructed when using an edit function and thereby prevent the production of wasteful copies resulting from inappropriate edit instruction.

To achieve the above object, the invention provides an image processor having edit functions and subjecting image data obtained by reading a document to an edit process and outputting the edited image data, the image processor comprising input means for inputting an edit instruction; judgment means having inappropriate edit instruction judgment data, for judging whether or not the inputted edit instruction is inappropriate; and alarm means for outputting alarm data based on the judgment of whether or not the inputted edit instruction is inappropriate.

BRIEF DESCRIPTION OF THE DRAWINGS

FIG. 2 is a diagram showing an exemplary general system configuration of the image processor;

DETAILED DESCRIPTION OF THE PREFERRED EMBODIMENT

An embodiment of the invention will now be described with reference to the accompanying drawings.

Figures 1A, 1B, 1C:
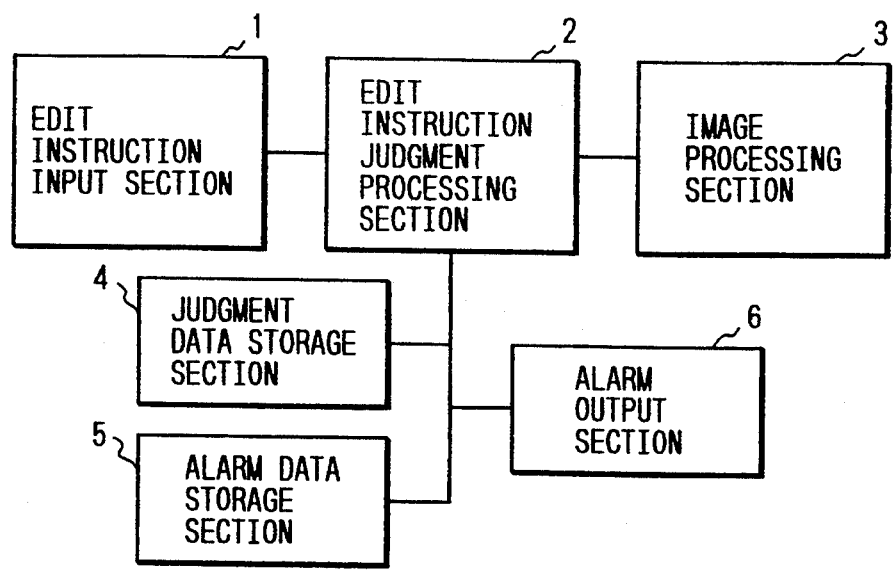
FIGS. 1 (a) through 1 (c) are diagrams for explaining an image processor having an edit limiting function according to an embodiment of the invention.

FIGS. 1 (a) through 1 (c) are diagrams for explaining an image processor having an edit limiting function according to an embodiment of the invention.

In FIG. 1 (a), an edit instruction input section 1 selectively specifies an edit function such as painting, color conversion, trimming, or rotation using units including a keyboard, a display, an edit pad, and a console panel, and also instructs and inputs its content. An edit instruction judgment processing section 2 judges whether an edit instruction is appropriate, and sets a finally confirmed edit instruction to an image processing section 3. A judgment data storage section 4 stores inappropriate data or conditions every edit function as data for judging an inappropriate edit instruction as shown, e.g., in FIG. 1 (b), and has a pointer for alarm data to be outputted when the edit instruction is judged inappropriate. An alarm data storage section 5 stores alarm data corresponding to inappropriate edit instructions. An alarm output section 6 including a display panel outputs these alarm data. The image processing section 3 is made up of an image processing system having various edit functions and connected to an image input terminal (IIT) and an image output terminal (IOT).

An exemplary setting of the judgment data storage section 4 shown in FIG. 1 (b) indicates that, for the paint function, the inappropriate data are the same color and the complementary color, and that its alarming condition is that alarm data 001 is outputted if specified once for the same color, and that alarm data 002 is outputted if a color complementary to the last specified color is specified for the complementary color. The inappropriate data may be such data as density range, hue, saturation, and color range. Further, the inappropriate data may be such data as to search an overlap with an already set edit area. The inappropriate data judgment criteria may be color and area, and alarming conditions may be that the instruction to be judged is the same as the last specification, that it is complementary to an already specified color, or that it overlaps with an already set area, etc., or whether judgment processing is performed may be set by a flag. In sum, any inappropriate data may be acceptable as long as it serves as an inappropriateness judgment criterion and as a condition to output alarm data when the instruction is judged inappropriate.

The operation of the edit instruction judgment processing section 2 is performed, e.g., in the following way. Upon input of the selection of an edit function and its content from the edit instruction input section 1, the edit instruction judgment processing section 2 refers to the judgment data storage section 4 to judge the inputted edit instruction based on the inappropriate data and its condition. When it is judged that the edit instruction is inappropriate, then the edit instruction judgment processing section 2 reads alarm data from the alarm data storage section 5 based on the alarm data pointer and outputs the read alarm data to the alarm output section 6. For example, if the paint function is instructed, the edit instruction judgment processing section 2 sets a table as shown in FIG. 1 (c) in a work area, registers a specified color every time it is confirmed, judges whether the newly specified color is the same as or complementary to a specified color already registered in the table, and refers to the sequence or counter value to check that such already specified color is the last data or the data before last, etc., so that inappropriateness of the edit instruction is judged. If the operator specifies to cancel the edit instruction based on the judgment result, the edit instruction judgment processing section 2 cancels the edit instruction, while if the operator specifies to confirm the edit instruction, the edit instruction judgment section 2 confirms the edit instruction even if an inappropriate data alarm has been outputted, and sets the edit instruction to the image processing section 3. Then, the edit instruction judgment processing section 2 updates the table shown in FIG. 1 (c) and prepares for a next edit instruction.

An exemplary general configuration of the image processor to which the invention is applied will be described next. FIG. 2 is a diagram showing an exemplary general system configuration of the image processor.

In FIG. 2, an IIT 21 is the image input terminal that reads a document with a CCD sensor to obtain image data; an IPS 22 is the image processing system that subjects the image data to various processing; and an IOT 23 is the image output terminal that outputs copies by driving, e.g., a laser printer in accordance with the image data. These components constitute a basic digital copy machine.

An edit pad 15 specifies and inputs edit contents when the various edit functions are used. A console panel 17 inputs data through its keys to select a function when the various functions are used. A display section 19 displays confirmations and inappropriate edit instruction alarm data in accordance with the edit contents and the like specified and inputted through the edit pad 15.

A main CPU (central processing unit) 11 processes inputs from the console panel 17 and edit pad 15, as well as outputs of the display 19, checks selected edit functions and their contents, and gives alarms when the edit instructions are found inappropriate, otherwise sets them to the IPS 22. A read only memory (ROM) 12 stores programs and data required to cause the CPU 11 to perform the above operations, and a random access memory (RAM) 13 is used as a work area for executing the programs and for storing data under processing and other necessary data as the case may require.

For example, the operation of setting an edit instruction is performed as follows.

An edit function is selected by operating the keys on the console panel 17, and the selected data is transmitted to the main CPU 11 from a keyboard switch I/F (interface) 16. The main CPU 11, upon selection of the edit function, switches the processing mode to an input mode and waits for an edit instruction from the edit pad 15. After the edit instruction has been sent to a serial communication LSI 14 from the edit pad 15 through a communication line, the main CPU 11 not only writes such input data into the RAM 13 on a CPU bus, but also performs comparison judgment processing if necessary.

If an alarm must be outputted as a result of the comparison judgment, corresponding alarm display data is read in the alarm display data prestored in the ROM 12 and transmitted to a display section I/F 18.

The display section I/F 18 transmits the alarm display data to the display section 19 while processing the alarm display data so as to be transmittable to the display section 19. Accordingly, the alarm data is displayed on the display section 19.

On the other hand, for example, "CONFIRM" and "CANCEL" buttons are provided on the console panel 17, so that the CPU 11 cancels the edit instruction on condition that the "CANCEL" button is pressed or sets the edit function to the IPS 22 according to the edit instruction on condition that no alarm is displayed and that the "CONFIRM" button is pressed.

The "CONFIRM" and "CANCEL" buttons may be displayed on the display section 19, and an input sensor such as a touchpanel may be arranged thereon to detect the specified positions.

Some exemplary edit limiting operations will specifically be described next.

Figure 3:
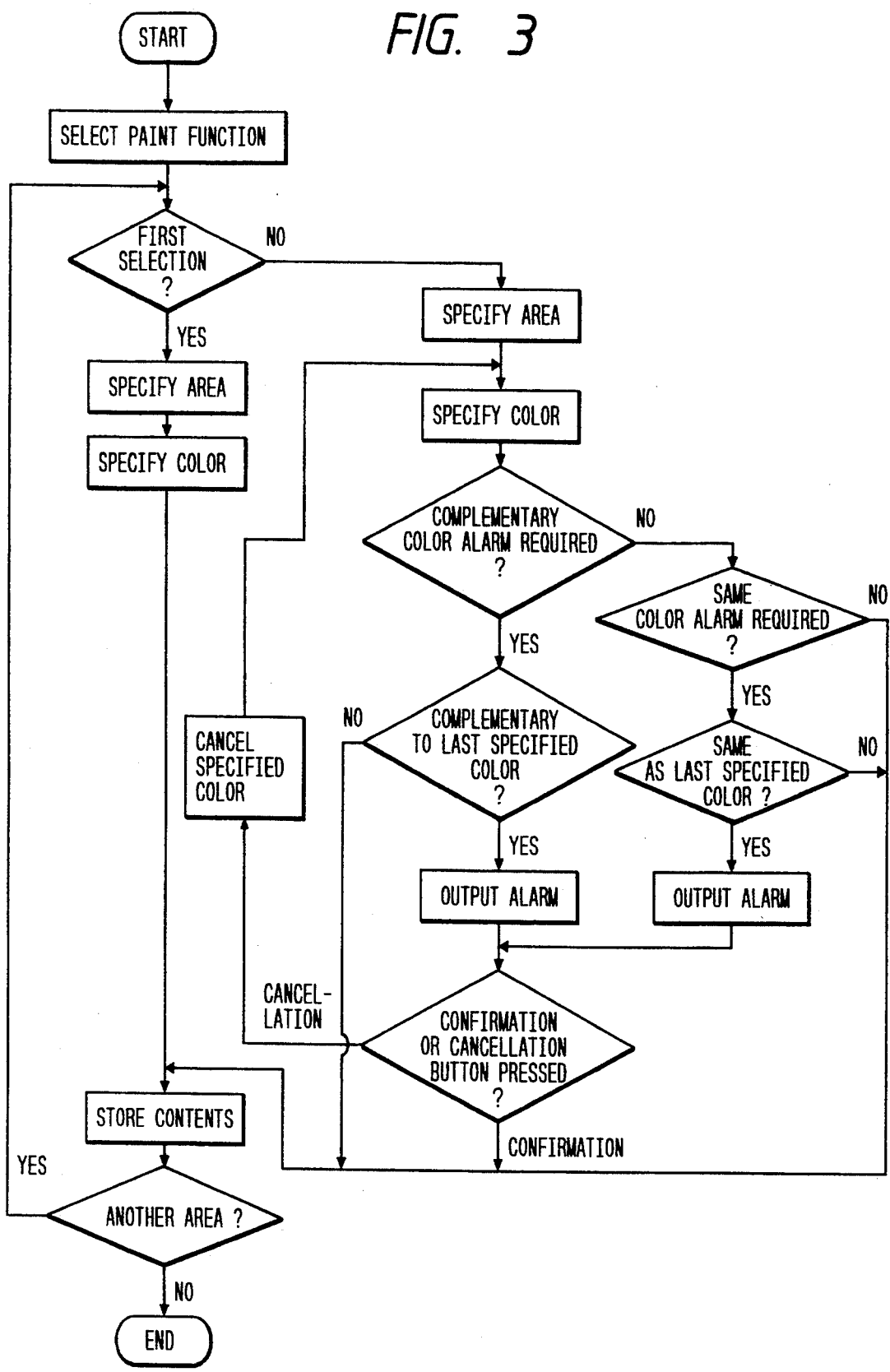
FIG. 3 is a flowchart for explaining an exemplary operation of limiting a painting function.
Figure 4:
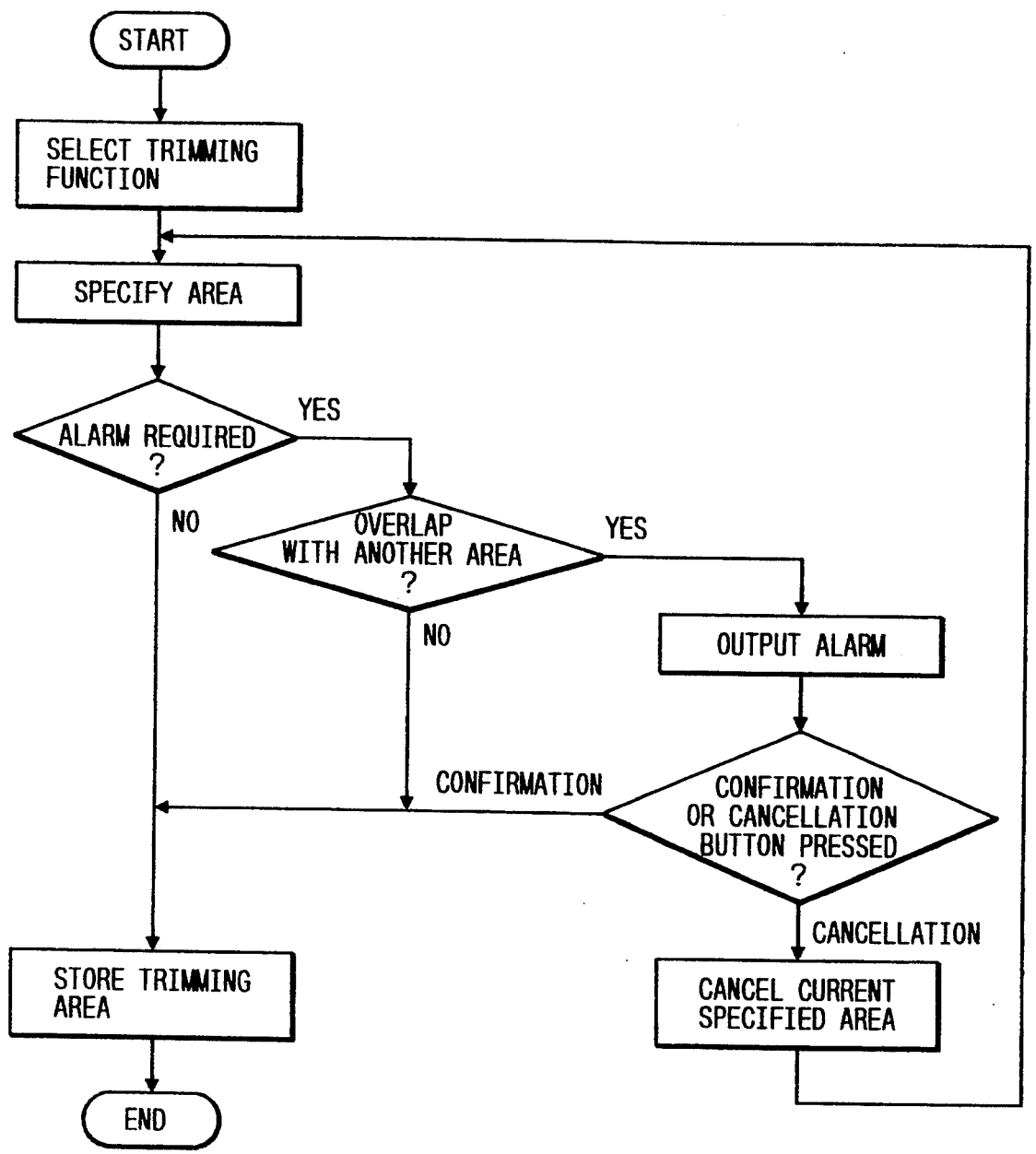
FIG. 4 is a flowchart for explaining an exemplary operation of limiting a trimming function.
Figure 5:
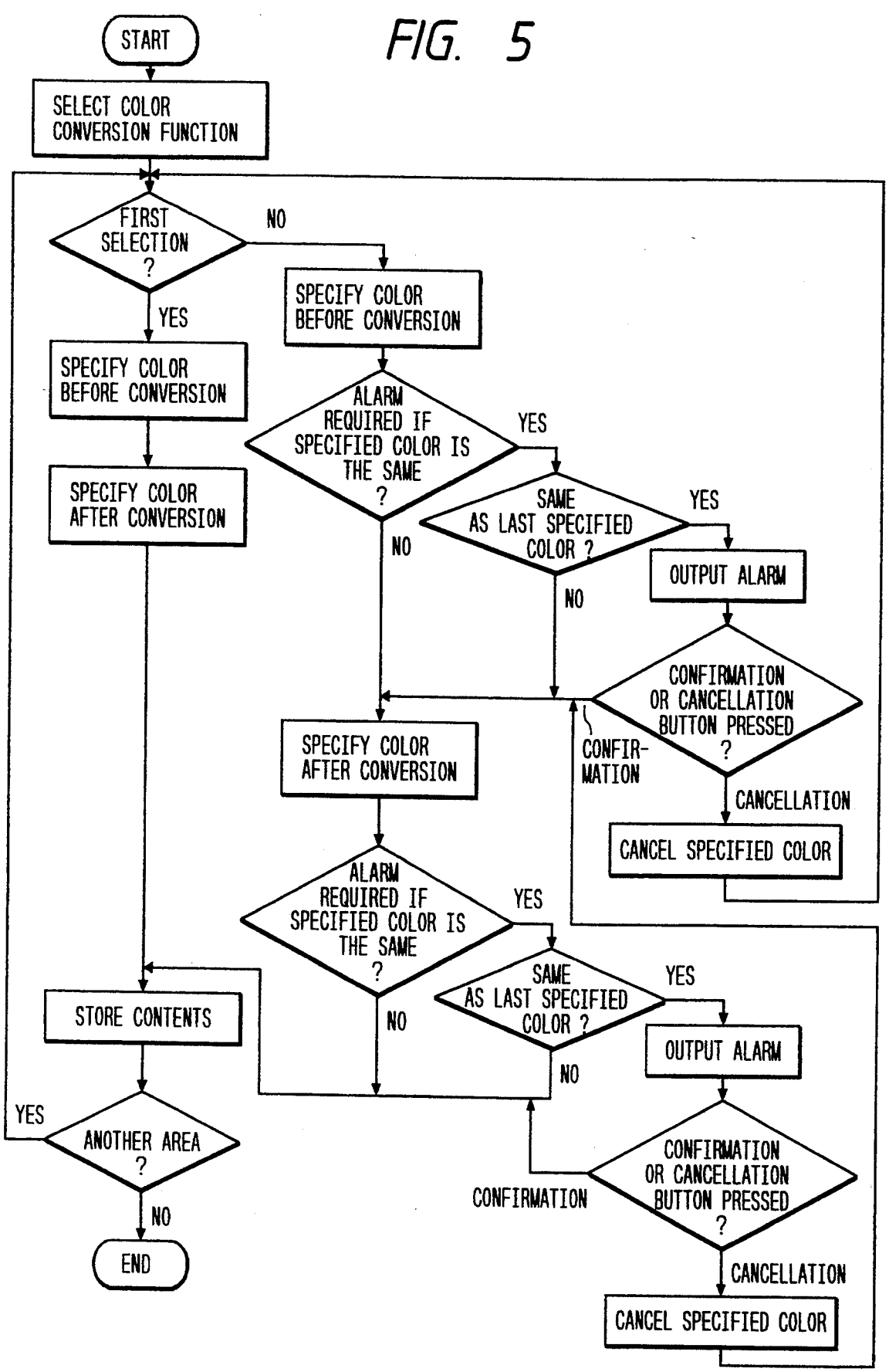
FIG. 5 is a flowchart for explaining an exemplary operation of limiting a color conversion function.
Figure 6A:
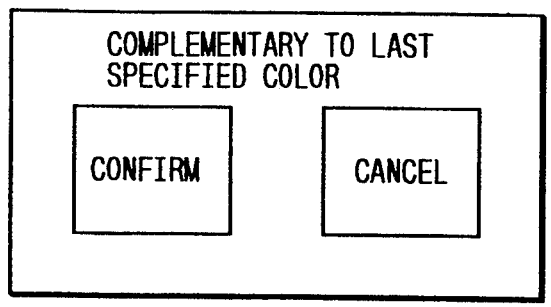
FIGS. 6 (a) through 6 (e) are diagrams showing exemplary alarm display contents.
Figure 6B:
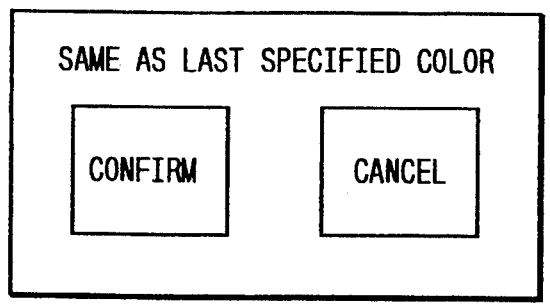
Figure 6C:
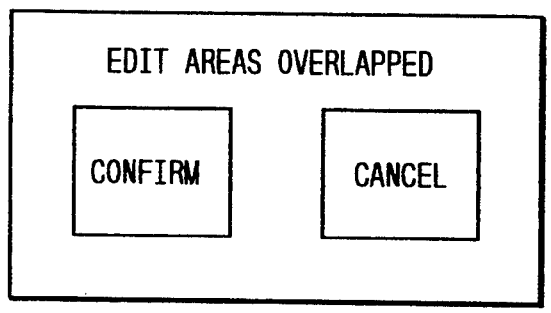
Figure 6D:
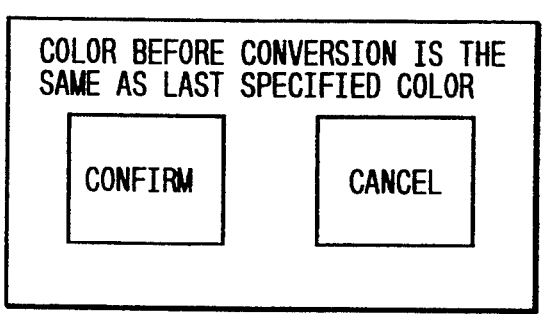
Figure 6E:
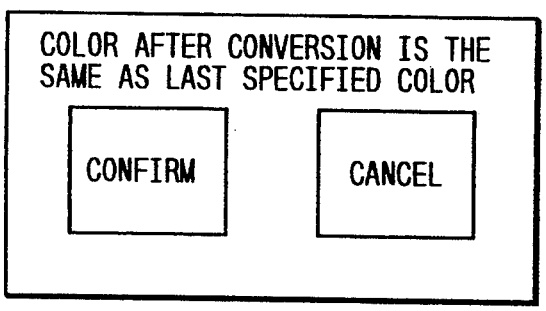

FIG. 3 is a flowchart for explaining an exemplary operation of limiting a paint function; FIG. 4 is a flowchart for explaining an exemplary operation of limiting a trimming function; FIG. 5 is a flowchart for explaining an exemplary operation of limiting a color conversion function; and FIGS. 6 (a) through 6 (e) are diagrams showing exemplary alarm contents.

When the paint function is selected, whether it is a first paint instruction or not is judged as shown in FIG. 3. If it is the first instruction, its area and color instructions are respectively processed in accordance with the input data and their contents are stored. If another area is instructed to be painted, the processing for the second and subsequent instructions will be performed.

In the case of the paint instructions on and after the second, the area and color instructions are processed in accordance with the input data, and it is judged whether the instruction requires an output of the complementary color alarm or an output of the same color alarm for the inputted color instruction. If no alarm is outputted, the contents of the area and color instructions are stored, and a next area is processed.

However, if it is set so that the complementary color alarm be outputted, it is judged whether the current specified color is complementary to the last specified color. If it is judged to be "NO" (the current specified color is not complementary to the last specified color), then the contents of the area and color instructions are stored as they are, and a next area is processed. If it is judged to be "YES" (the current specified color is complementary to the last specified color), then an alarm as shown in FIG. 6 (a) is displayed, prompting to press the "CONFIRM" or "CANCEL" button. The current specified color is cancelled when the "CANCEL" button has been pressed, and a new color specification is inputted. When the "CONFIRM" button has been pressed even with the alarm displayed, the contents of the area and color instructions are stored as they are, and a next area is processed, as it is indicated that the operator has confirmed his intention of processing the instruction as currently specified.

Further, if it is so set as to give the same color alarm, whether the current specified color is the same as the last specified color is judged. Then, the same operations as in the complementary color alarm processing will be followed thereafter, and an alarm as shown in FIG. 6 (b) is displayed.

The last specified color may be only the one specified immediately before, or one of all colors specified before the current specified color.

In the case where the trimming function is selected, a trimming area is specified as shown in FIG. 4. Then, whether the alarm is required is judged. If no alarm is required, the specified trimming area is stored. If, on the other hand, the alarm is required, whether the trimming area overlaps with an already specified edit area is judged. For example, the last instruction is trimming, whether the trimming area overlaps with an already specified edit area is judged, while if the first instruction is trimming, whether the subsequent edit areas overlap with the trimming area is judged.

If it is judged to be "YES" (there is an overlap), an alarm as shown in FIG. 6 (c) is displayed, prompting to press the "CONFIRM" or "CANCEL" button. When the "CANCEL" button has been pressed, the current specified area is cancelled and a new area will be specified. When the "CONFIRM" button has been pressed even with the alarm displayed, the specified trimming area is stored as it is, after checking that it does not overlap with unusable areas, as it is indicated that the operator has confirmed his intention of processing the instruction as currently specified.

In the trimming function, the problem of erroneously trimming an already set edit area is encountered. To overcome this problem, first an already specified edit area is compared with a trimming area. Then, if the already set edit area is to be trimmed, the above processing is employed to remind the operator of such an error.

Further, when the color conversion function is selected, it is judged whether it is a first color conversion instruction. If it is the first instruction, then the colors before and after the conversion are respectively processed in accordance with the input data, and these data are stored. If another area is instructed to be color-converted, the processing for the second and subsequent instructions will be performed.

For the color conversion instructions on and after the second, a color before the convention is specified, and whether the same color alarm must be outputted is judged. If it is judged to be "YES" (the alarm must be outputted), then whether the current specified color is the same as the last specified color is Judged. If they are the same, an alarm as shown in FIG. 6 (d) is displayed, prompting to press the "CONFIRM" or "CANCEL" button. When the "CANCEL" button has been pressed, the current specified color is cancelled, and a new color is inputted or specified. When the "CONFIRM" button has been pressed even with the alarm displayed, a color after the conversion is specified, as it is indicated that the operator has confirmed his intention of processing the instruction as currently specified. The color after the conversion will similarly be specified if it is so arranged that no alarm is outputted, or if the current specified color is not the same as the last specified color even though it is so arranged that the alarm is outputted.

Upon inputting the color after the conversion, whether the same color alarm is to be outputted and whether the current specified color is the same as the last specified color are judged, and the same processing as in the color specification before the conversion is performed. Then, an alarm as shown in FIG. 6 (e) is displayed.

For example, in the case where the color conversions from red to blue and from yellow to green are specified erroneously as color conversions from red to blue and from red to green, it is only the color conversion from red to green that is effected. If they are erroneously specified as color conversions from red to blue and from yellow to blue, then these color conversions are effected as requested. The above processing can remind the operator of an error, so that errors are reduced.

The invention is not limited to the above embodiment, but may be modified in various ways. For example, while alarm data are displayed when the current specified color is the same as or complementary to the already specified color or the last specified color in the above embodiment, it may be so arranged as to judge it inappropriate when two specification errors occur in succession without considering a single specification error, or when a predetermined number of specification errors are made. Further, it may be so arranged that data is judged inappropriate not by color, but by density in such a manner that the data is judged inappropriate when high density specifications are made successively. It may be also acceptable to judge the data inappropriate when a plurality of elementary color specifications greater than a predetermined number are made, the elementary color including red, blue, green, yellow, and the like.

As is apparent from the foregoing description, the image processor of the preferred embodiment of the invention judges at the judgment means whether a consecutively inputted edit instruction is inappropriate and outputs alarm data in accordance with the judgment result, thereby allowing the operator to check and review the edit instruction based on the alarm data. Thus, careless production of wasteful copies based on inappropriate edit instructions can be prevented, thereby contributing to curtailing not only waste of resources such as copy paper, toner, and electric power, but also waste of time. Further, since the edit instruction is judged inappropriate on condition that its specified color is the same as or complementary to a reference color, that its specified area overlaps with a reference area, or the like, edit instructions such as those having inconsistently or abnormally specified colors, including overlapping portions, other errors, and the like can be checked.

What is claimed is:

1. An image processor having edit functions and subjecting image data obtained by reading a document to an edit processing and outputting the edited image data, said image processing comprising:

inputting means for inputting an edit instruction specifying a color;

judging means, having inappropriate edit instruction judgment data, for judging whether the specified color is inappropriate; and outputting means for outputting alarm data based on the judgment of whether the specified color is inappropriate, wherein said inappropriate edit instruction judgment data includes data to judge whether the specified color is the same as either the last specified color or an already specified color before last.

2. An image processor having edit functions and subjecting image data obtained by reading a document to an edit processing and outputting the edited image data, said image processing comprising:

inputting means for inputting an edit instruction specifying a color;

judging means, having inappropriate edit instruction judgment data, for judging whether the specified color is inappropriate; and outputting means for outputting alarm data based on the judgment of whether the specified color is inappropriate, wherein said inappropriate edit instruction judgment data includes data to judge whether the specified color is complementary to the last specified color or an already specified color before last.

3. An image processor having edit functions and subjecting image data obtained by reading a document to an edit processing and outputting the edited image data, said image processing comprising:

inputting means for inputting an edit instruction specifying a color;

judging means, having inappropriate edit instruction judgment data, for judging whether the specified color is inappropriate; and outputting means for outputting alarm data based on the judgment of whether the specified color is inappropriate, wherein said outputting means includes means for outputting said alarm data on condition that an inappropriate color has been specified greater than a predetermined number of times.

4. An image processor having edit functions and subjecting image data obtained by reading a document to an edit processing and outputting the edited image data, said image processing comprising:

input means for inputting an edit instruction;

judging means, having inappropriate edit instruction judgment data, for judging whether the inputting edit instruction is inappropriate, the judgment data being configured to judge whether a specified color is the same as either the last specified color or a specified color before the last specified color with respect to an edit function for specifying colors; and alarm means for outputting alarm data based on the judgment of whether the inputting edit instruction is inappropriate.

5. An image processor having edit functions and subjecting image data obtained by reading a document to an edit processing and outputting the edited image data, said image processing comprising:

input means for inputting an edit instruction;

judging means, having inappropriate edit instruction judgment data, for judging whether the inputting edit instruction is inappropriate, the judgment data being configured to judge whether a specified color is complementary to the last specified color or a specified color before the last specified color with respect to an edit function for specifying colors; and alarm means for outputting alarm data based on the judgment of whether the inputting edit instruction is appropriate.

6. An image processor having edit functions and subjecting image data obtained by reading a document to an edit processing and outputting the edited image data, said image processing comprising:

input means for inputting an edit instruction;

judging means, having inappropriate edit instruction judgment data, for judging whether or not the inputting edit instruction is inappropriate; and alarm means for outputting alarm data based on the judgment of whether an inappropriate edit instruction has been specified greater than a predetermined number of times.

7. A method of operating an image processor having edit functions and subjecting image data obtained by reading a document to an edit processing and outputting the edited image data, the method comprising the steps of:

accepting an edit instruction specifying a color;

judging whether the edit instruction is inappropriate based upon whether the specified color is the same as either the last specified color or a specified color before the last specified color; and outputting alarm data based on a result of the judging step.

8. A method of operating an image processor having edit functions and subjecting image data obtained by reading a document to an edit processing and outputting the edited image data, the method comprising the steps of:

accepting an edit instruction specifying a color;

judging whether the edit instruction is inappropriate based upon whether a specified color is complementary to the last specified color or a specified color before the last specified color; and outputting alarm data based on a result of the judging step.

9. A method of operating an image processor having edit functions and subjecting image data obtained by reading a document to an edit processing and outputting the edited image data, the method comprising the steps of:

accepting an edit instruction;

judging whether the edit instruction is inappropriate; and outputting alarm data based upon whether an inappropriate edit instruction has been specified greater than a predetermined number of times.

* * * * *